A. H. WEHR.
SEWAGE DISPOSAL PLANT.
APPLICATION FILED MAR. 12, 1912.

1,027,948.

Patented May 28, 1912.

2 SHEETS—SHEET 1.

Witnesses:
Thomas Byrnes
Emma Bell

Inventor:
Albert H. Wehr
By Chafin & Ferguson
Attorney

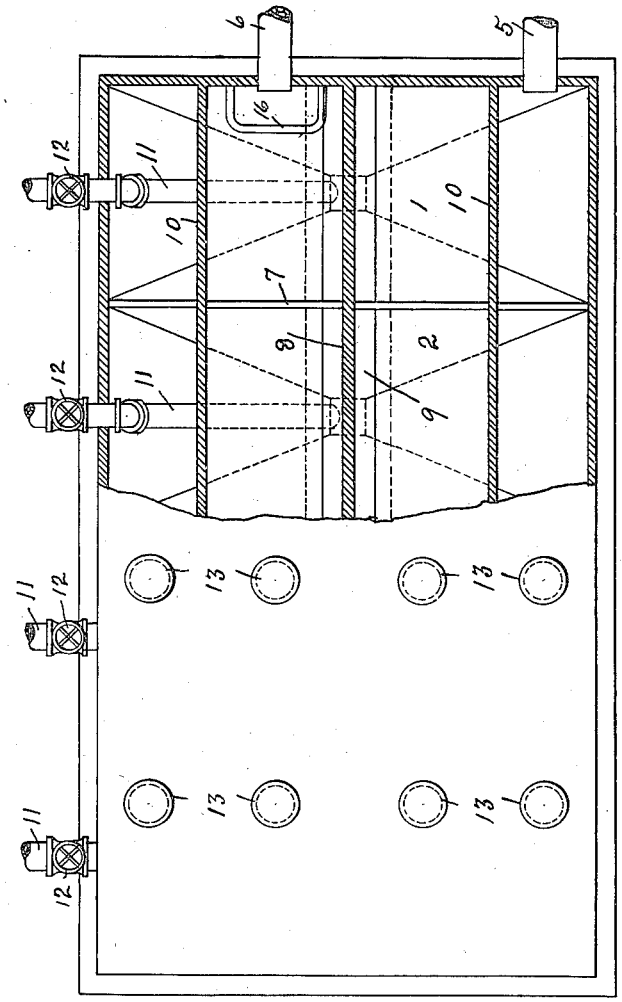

UNITED STATES PATENT OFFICE.

ALBERT H. WEHR, OF MOUNT WASHINGTON, MARYLAND.

SEWAGE-DISPOSAL PLANT.

1,027,948.     Specification of Letters Patent.     Patented May 28, 1912.

Application filed March 12, 1912. Serial No. 683,398.

*To all whom it may concern:*

Be it known that I, ALBERT H. WEHR, a citizen of the United States, residing at Mount Washington, in the county of Baltimore and State of Maryland, have invented certain new and useful Improvements in Sewage-Disposal Plants, of which the following is a specification.

This invention relates to improvements in sewage disposal plants.

The invention consists of the novel construction and arrangement of the parts and combination of parts hereinafter more fully set forth in the following specification and pointed out in detail in the claims.

Figure 1:
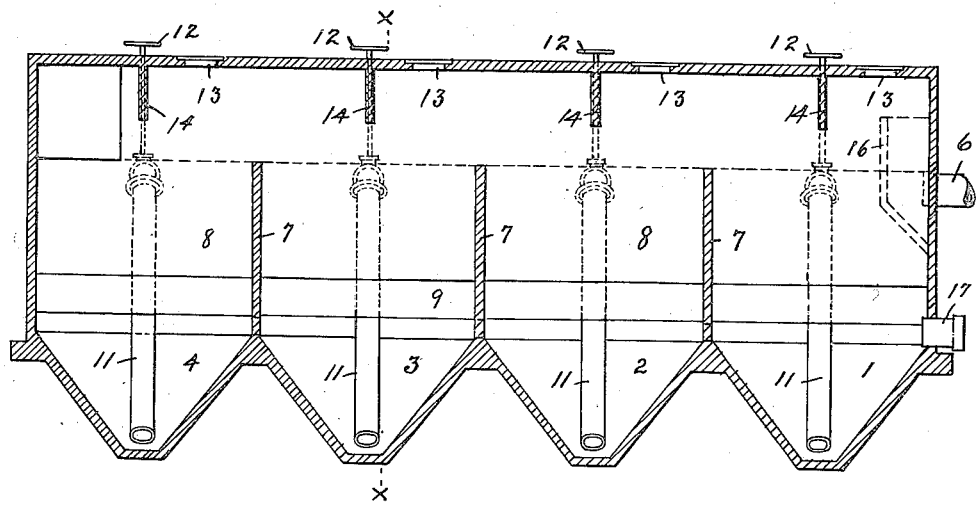
Figure 2:
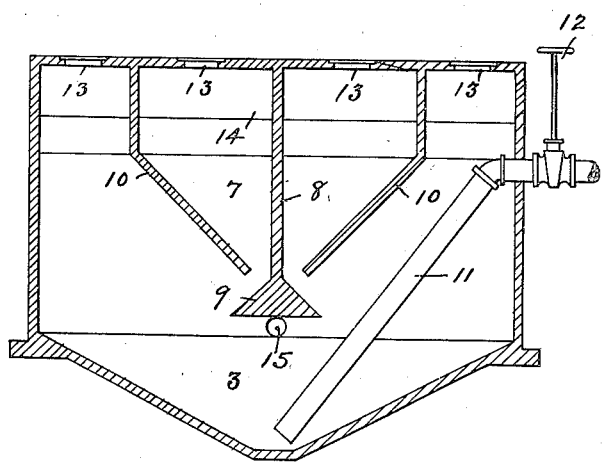

In the accompanying drawings,—Figure 1 is a vertical sectional view of our invention. Fig. 2 is a vertical sectional view on the line X—X of Fig. 1. Fig. 3 is a plan view of our invention, partly broken away.

Referring to the accompanying drawings, forming part of this specification and in which like reference numerals designate like parts through the several views thereof, 1, 2, 3 and 4 designate intercommunicating tanks. The tank 1 is provided with a sewage inlet pipe 5 at one side of the central wall and a sewage outlet pipe 6 at the other side of said wall. These tanks are all provided with bottoms sloping downwardly from each side thereof toward the center, and with baffle or partition walls 7 terminating below the top of the tanks. The central wall 8 extends the full length of all of said tanks and projects downwardly from the top and terminates in a flared lower end 9 above the bottom of the tanks and is partly cut away in the tank 4 to allow the sewage to flow around said wall to the other side of the tank 4 and back through the tanks on the opposite side of the central wall to the outlet. The walls 10, 10 extend the full length of said tanks and project downwardly from the top on a vertical line to or about the top of the partition walls 7 at which point they converge and terminate above the flared end 9 of the central wall 8. The tanks 1, 2, 3 and 4 are each provided with a pipe 11 which projects from near the bottom of the tank up through the side wall of the tank and is provided with a valve 12 on the outside, by means of which the flow of the sludge from the tanks is regulated. The tanks are each provided with man holes 13 to permit of entrance thereto at the different points thereof. The tanks are also provided with reinforced beams 14 to brace the tops of the tanks and also to act as baffle walls. The outlet 6 is surrounded on the inside by a set-off or projection 16 the upper end of which is open and above the lower ends of the walls 14.

The sewage enters the tank 1 on one side of the central wall 8 through the pipe 5 and as it rises in said tank the sludge rises and falls, and in so doing strikes against the converging ends of the wall 10, and the flared end of the wall 8, which act as baffles to prevent the sludge flowing into the tank 2 with the water, which latter flows up between the central wall 8 and the wall 10 on that side and overflows into the tank 2. The same action takes place in tank 2 as that just described in tank 1, and any sludge which may pass into tank 2 will sink to the bottom thereof. The water flows from tank 2 to tank 3 and then to tank 4, the flared end of the wall 8 and the converging end of the wall 10 acting as baffles in each tank to prevent the sludge passing therefrom with the water. By the time the water reaches tank 4 it is practically clear and flows therefrom back into tank 3, then to tank 2 and finally to tank 1, on the opposite side of the wall 8, and out through the outlet pipe 6 to the aseptic bed (not shown) where it receives its final purification. The flow of the sewage being down one side of the central wall 8 and back on the opposite side and out through the outlet 6. The projection or off-set 16 being above the lower ends of the walls 14 the latter also serve as baffles against which any solid matter may strike and fall in the tank below. In the lower end of the tank 1 is a pipe 17 by means of which connection can be made for the purpose of flushing said tanks and cleaning same. The partition walls 7 are also provided with apertures 15 at the lower end. The sludge which remains in the tanks 1, 2, 3 and 4 is siphoned off through the pipes 11, and carried to any desired point.

While we have shown and described our invention as embodying four tanks, it is obvious any number of tanks may be employed.

Having thus described my invention, what I claim is:

1. A plurality of intercommunicating tanks, the first one of which has an inlet and outlet, a central wall extending the full length of all of said tanks and projecting from the top to near the bottom thereof and partly cut away in the last tank, and two walls extending the full length of all of said tanks and projecting from the top thereof and converging toward the central wall and terminating above the lower end of the latter.

2. A plurality of intercommunicating tanks the first one of which has an inlet and an outlet, a central wall extending the full length of all of said tanks and projecting from the top terminating in a flared lower end above the bottoms of said tanks, and partly cut away in the last tank, and two walls extending the full length of all of said tanks and projecting from the top thereof and converging toward and terminating above the flared lower end of the central wall.

3. A plurality of intercommunicating tanks having an inlet and an outlet, the partition walls of said tanks terminating below the top thereof, a central wall extending the full length of all of said tanks and projecting from the top downwardly and terminating in a flared end above the bottoms of said tanks and partly cut away in the last tank, two walls extending the full length of all of said tanks and projecting downwardly on a straight line to the top of the partition walls of said tanks and then converging toward and terminating above the flared end of the central wall.

4. A plurality of intercommunicating tanks having the bottoms thereof sloping from each side toward the middle, and the partition walls of said tanks terminating below the top of the tanks, an inlet pipe connected to one of said tanks, an outlet pipe connected to the same one of said tanks, a central wall extending the full length of all of said tanks and projecting from the top downwardly and terminating in a flared end above the bottom of said tanks, and partly cut away in the last tank, two walls extending the full length of all of said tanks and projecting downwardly on a straight line to or about the top of the partition walls of said tanks and then converging toward and terminating above the flared end of the central wall.

5. A plurality of intercommunicating tanks having an inlet and an outlet, the partition walls of said tanks terminating below the top thereof, a central wall extending the full length of all of said tanks and projecting from the top downwardly and terminating in a flared end above the bottoms of said tanks, and partly cut away in the last tank, two walls extending the full length of all of said tanks and projecting downwardly on a straight line to the top of the partition walls of said tanks and then converging toward and terminating above the flared end of the central wall, and a pipe extending from near the bottom of each tank upwardly through the side wall near the top thereof.

6. A plurality of intercommunicating tanks having their bottoms sloping downwardly from each side thereof toward the center and the partition walls of said tanks, terminating below the top thereof, an inlet pipe leading to the first tank, an outlet pipe leading from the same tank, a central wall projecting the full length of all of the said tanks and extending downwardly from the top and terminating in a flared end above the bottoms of said tanks, and partly cut away in the last tank, two walls projecting the full length of said tanks parallel with the central wall and having their lower ends converging toward and terminating above the flared end of the central wall, a pipe extending from near the bottom of each tank upwardly and projecting through the side wall near the top thereof, and a valve in each of said pipes.

In testimony whereof I affix my signature in presence of two witnesses.

ALBERT H. WEHR.

Witnesses:
EMIL R. DENHARD,
MARTIN J. WEST.